US011319001B2

(12) United States Patent
Olsson et al.

(10) Patent No.: US 11,319,001 B2
(45) Date of Patent: May 3, 2022

(54) ASSEMBLY FOR RELEASABLY ENGAGING AN UPPER VEHICLE PART WITH A BASE VEHICLE PART

(71) Applicant: Volvo Construction Equipment AB, Eskilstuna (SE)

(72) Inventors: Björn Olsson, Växjö (SE); Tonie Jurgec, Eskilstuna (SE); Jan Nilsson, Tollarp (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 16/769,265

(22) PCT Filed: Dec. 6, 2017

(86) PCT No.: PCT/EP2017/081688
§ 371 (c)(1),
(2) Date: Jun. 3, 2020

(87) PCT Pub. No.: WO2019/110095
PCT Pub. Date: Jun. 13, 2019

(65) Prior Publication Data
US 2021/0179203 A1 Jun. 17, 2021

(51) Int. Cl.
*B62D 33/077* (2006.01)
*B62D 27/04* (2006.01)
(Continued)

(52) U.S. Cl.
CPC ........... *B62D 33/077* (2013.01); *B62D 27/04* (2013.01); *B62D 27/065* (2013.01); *B62D 24/00* (2013.01); *B62D 24/02* (2013.01); *B62D 27/06* (2013.01)

(58) Field of Classification Search
CPC ...... B62D 33/00; B62D 33/06; B62D 33/077; B62D 33/0604; B62D 33/0617;
(Continued)

(56) References Cited

U.S. PATENT DOCUMENTS 7,607,721 B2   10/2009   Grimes et al.
8,182,024 B2 *  5/2012   Hayes ............... B62D 33/067
                                              296/190.07
(Continued)

FOREIGN PATENT DOCUMENTS

CN      101177151 A      5/2008
CN      203601410 U      5/2014
(Continued)

OTHER PUBLICATIONS

International Search Report and Written Opinion of the International Searching Authority, PCT/EP2017/081688, dated Aug. 21, 2018, 14 pages.
(Continued)

*Primary Examiner* — D Glenn Dayoan
*Assistant Examiner* — Joyce Eileen Hill
(74) *Attorney, Agent, or Firm* — Sage Patent Group (57) ABSTRACT

An assembly for releasably engaging an upper vehicle part with a base vehicle part comprises the upper vehicle part, the base vehicle part and a securing assembly for ensuring that the upper vehicle part is secured to the base vehicle part in an operational state of the vehicle. The securing assembly comprises an inter-connecting member adapted to extend from the upper vehicle part to the base vehicle part in said operational state, said inter-connecting member having a body portion and a projecting portion defining an abutment surface. The securing assembly further comprises a releasable fixation support having a recess adapted to accommodate a part of the body portion, wherein another part of the
(Continued)

releasable fixation support is capable of restricting displacement of said inter-connecting member in a direction towards said upper part vehicle by engaging with said abutment surface of said projecting portion in said operational state.

14 Claims, 7 Drawing Sheets

(51) Int. Cl.
*B62D 27/06* (2006.01)
*B62D 24/00* (2006.01)
*B62D 24/02* (2006.01)

(58) Field of Classification Search
CPC ........ B62D 21/09; B62D 24/00; B62D 24/02; B62D 25/147; B62D 27/04; B62D 27/065; B60R 21/131
USPC .................................. 296/35.1, 35.3, 190.07
See application file for complete search history.

(56) References Cited

U.S. PATENT DOCUMENTS

| | | | |
|---|---|---|---|
| 2006/0071499 A1 | 4/2006 | Yoon | |
| 2011/0115196 A1* | 5/2011 | Wulff | B60D 1/32 280/477 |
| 2015/0061272 A1* | 3/2015 | Watanabe | B62D 21/11 280/784 |
| 2015/0233402 A1 | 8/2015 | Hudson et al. | |
| 2016/0096553 A1 | 4/2016 | Valerio et al. | |

FOREIGN PATENT DOCUMENTS

| | | |
|---|---|---|
| EP | 1454821 A1 | 9/2004 |
| EP | 2065294 A1 | 6/2009 |
| KR | 20090070667 A | 7/2009 |
| WO | 2007117183 A1 | 10/2007 |
| WO | 2009082274 A1 | 7/2009 |

OTHER PUBLICATIONS

Chinese First Office Action dated Jan. 6, 2022 for Chinese Patent Application No. 201780097382.6, 17 pages (including English translation).

* cited by examiner

ASSEMBLY FOR RELEASABLY ENGAGING AN UPPER VEHICLE PART WITH A BASE VEHICLE PART

CROSS REFERENCE TO RELATED APPLICATIONS

This application is a 35 U.S.C. § 371 national stage application of PCT International Application No. PCT/EP2017/081688 filed on Dec. 6, 2017, the disclosure and content of which is incorporated by reference herein in its entirety.

TECHNICAL FIELD

The invention relates to an assembly for releasably engaging an upper vehicle part with a base vehicle part. The invention also relates to a vehicle comprising such an assembly, e.g. a working machine in the form of an articulated hauler comprising such an assembly. The invention is applicable on vehicles, in particular working machines within the fields of industrial construction machines or construction equipment, such as articulated haulers. Although the invention will mainly be described in relation to an articulated hauler, it may also be applicable for other type of vehicles and working machines such as e.g. dump trucks, wheel loaders and the like.

BACKGROUND

In connection with transportation of heavy loads at construction sites or the like, a working machine is often used. The working machines may be utilized for transportations in connection with road or tunnel building, sand pits, mines, forestry and similar environments. Thus, the working machine is frequently operated with large and heavy loads in rough terrain and on slippery ground where no regular roads are present.

Further, for reasons of safety, the cab part or cab structure of the working machine should be sufficiently strong to provide the driver with a personal survival space if the vehicle should roll over onto the cab. In this connection, ROPS requirements are often mentioned, with the acronym ROPS standing for Roll Over Protection Structure. The ROPS requirement generally depends upon the weight of the vehicle, i.e. a heavier machine requires a more substantial and therefore often heavier cab.

Moreover, there is an increasing demand on reducing service and maintenance time of working machines.

In view of the aforesaid, it would be desirable to improve the function of the connection between the cab structure and the frame vehicle part of a working machine to comply with the demands as to roll over protection without compromising on the demands as to reducing service and maintenance time of the components making up the roll over protection system in a working machine.

SUMMARY

It is an object of the present invention to provide an improved assembly for releasably engaging an upper vehicle part with a base vehicle part, which assembly comprises a securing assembly ensuring engagement between the upper vehicle part and the base vehicle part in an operational state, while facilitating maintenance and service of the components in a non-operational state. The object is at least partly achieved by an assembly to claim 1.

According to a first aspect of the present invention, there is provided an assembly for releasably engaging an upper vehicle part with a base vehicle part. The assembly comprises the upper vehicle part, the base vehicle part and a securing assembly for ensuring that the upper vehicle part is secured to the base vehicle part in an operational state of the vehicle. The securing assembly comprises an inter-connecting member adapted to extend from the upper vehicle part to the base vehicle part in the operational state. The inter-connecting member has a body portion and a projecting portion which defines an abutment surface. Further, the securing assembly comprises a releasable fixation support adapted at one end to be releasably affixed to one of the upper vehicle part and the base vehicle part and having a recess with an open end at a second end. The recess is adapted to accommodate a part of the body portion of the inter-connecting member. Moreover, another part of the second end of the releasable fixation support is capable of restricting displacement of the inter-connecting member in a direction towards the upper part vehicle by engaging with the abutment surface of the projecting portion in the operational state.

In this manner, the upper vehicle part and the base vehicle part are maintained in the engaged state by the securing assembly in the operational state of the assembly, while permitting the upper vehicle part and the base vehicle part to release from each other in a non-operational state, i.e. when the releasable fixation support is released from at least the inter-connecting member of the securing assembly. To release the upper vehicle part from the base vehicle part is particularly useful when there is a need for service and maintenance of the components making up the assembly, or any other neighbouring components of the vehicle not being easily accessible if the components are in the engaged state (i.e. the operational state). In particular, the upper vehicle part and the base vehicle part are maintained in the engaged state when the securing assembly is in the operational state. The release of the upper vehicle part and the base vehicle part relative each other is obtained by setting the securing assembly in the non-operational state. For instance, the release of the upper vehicle part and the base vehicle part relative each other is obtained by disengaging the releasable fixation support from the inter-connecting member. When the securing assembly is in its non-operational state, the upper vehicle can be released from the base vehicle part so as to undergo maintenance service in easy manner.

Accordingly, the assembly comprises the securing assembly ensures engagement between the upper vehicle part and the base vehicle part in the operational state, while facilitating maintenance and service of the components in the non-operational state.

The example embodiments of the assembly are particularly useful when the inter-connecting member is configured to be part of a so called roll over protection system, thus ensuring that the cab vehicle part (upper vehicle part) is firmly connected to the frame vehicle part (base vehicle part) in order to withstand loads etc. during a vehicle roll over incident. In this type of situations, the system should typically meet various safety requirements that may include strength requirement, energy safety requirement etc.

Therefore, the inter-connecting member is generally provided in the form of a relatively large dimensioned member, typically in the size of M30 (referring to common wrench sizes for metric screw threads). This type of inter-connecting member is tightened with a high torque in order to ensure a secure engagement of the cab vehicle part with the frame vehicle part. However, when using this type of a firmly connected inter-connecting member in a roll over protection system, the service and maintenance of the components making up the system, or other components in the vehicle, may be troublesome. In order to facilitate this type of service operation, while still having an assembly that can be used in an roll over protection system, the example embodiments provides for disengaging (releasing) the cab vehicle part relative the frame base vehicle part by the releasable fixation support as mentioned above. The releasable fixation support, which is releasably affixed at one end to one of the upper vehicle part and the base vehicle part, while being engageable with the inter-connecting member at the other end, enables to separate a cab suspension unit for the cab vehicle part with the parts making up the roll over protection system. That is, the suspension unit can be arranged at the end of the releasable fixation support where it is releasably affixed to one of the upper vehicle part and the base vehicle part, while the roll over protection function is provided via the inter-connecting member (when engaged with the releasable fixation support). Moreover, the releasable fixation support can be releasably affixed with a lower torque to one of the cab vehicle part and the frame base vehicle part at the end of the releasable fixation support than the torque used for securing the inter-connecting member to the cab vehicle part. In addition, the releasable fixation support can be releasably affixed with a lower dimensioned screw connection to one of the cab vehicle part and the frame base vehicle part at the end of the releasable fixation support than the dimensions of the screw connection used for securing the inter-connecting member to the cab vehicle part. In this manner, it becomes possible to change cab suspension unit without interfering with parts making up the roll over protecting system by releasing the affixation of the releasable fixation support where it is releasably affixed to one of the upper vehicle part and the base vehicle part and subsequently disengaged and removing the releasable fixation support from its engaging state with the abutment surface of the projecting portion of the inter-connecting member.

Accordingly, there is provided an assembly in connection with the cab vehicle part and the frame vehicle part that contributes to reducing the service time of the vehicle, while ensuring that the connection is sufficiently stable to meet the ROPS requirement on the vehicle.

In other words, the assembly via the inter-connecting member, is configured to provide a transmission of forces to the cab structure (upper vehicle part) in the event of a specific inclination or canting of the cab being exceeded. The specific inclination corresponds suitably to the driver experiencing the inclination as unpleasant and/or feels there is a danger that the vehicle will tip over.

Typically, although not strictly required, the releasable fixation support may be adapted to release from one of the upper vehicle part and the base vehicle in the non-operational state, thereby permitting the releasable fixation support to disengage from the inter-connecting member in the non-operational state such that the projecting portion of the inter-connecting member is permitted to displace in the direction towards the upper vehicle.

According to one example embodiment, the securing assembly comprises a fastening member. The fastening member is configured to releasably affix the one end of the releasable fixation support to one of the upper vehicle part and the base vehicle part.

As mentioned above, the release of the upper vehicle part and the base vehicle part relative each other is obtained by setting the securing assembly in its non-operational state. For instance, the release of the upper vehicle part and the base vehicle part relative each other is obtained by disengaging the releasable fixation support from the inter-connecting member, and typically from the fastening member. When the securing assembly is in its non-operational state, the upper vehicle can be released from the base vehicle part so as to undergo maintenance service in easy manner.

According to one example embodiment, the releasable fixation support is non-rotational affixed to one of the upper vehicle part and the base vehicle part. In this manner, the connection between the releasable fixation support and the vehicle part(s) is further strengthen to provide an even more reliable engagement of the components in the operational state of the assembly.

By way of example, the releasable fixation support is affixed to one of the upper vehicle part and the base vehicle part by an elongated fastening member, such as a screw connection, e.g. a bolt.

According to one example embodiment, the releasable fixation support resembles a fork plate having opposite arranged end projecting parts defining the recess there between with the open end at the second end of the fixation support. The open-ended recess is adapted to accommodate the part of the body portion of the inter-connecting member, whereby the projecting portion of the inter-connecting member is restrained from passing through an opening in the base vehicle part by the opposite arranged end projecting parts of the fork plate. A releasable fixation support shaped as a fork plate provides an improved assembly and securing assembly in terms of functionality, as described above, and user-friendliness to permit disengaging the assembly during a service operation in a relatively easy manner. In addition, a fork plate shape is easy to handle and easy to mount even when there is a lack of space between the components making up the upper vehicle part and bae vehicle part.

Typically, the recess extends at least partly in a length direction to permit removal of the releasable fixation support from the inter-connecting member upon a movement of the releasable fixation support in a direction opposite the open end of the recess.

According to one example embodiment, and when the releasable fixation support is in the operational state relative the inter-connecting member, the releasable fixation support is arranged in-between the projecting portion of the inter-connecting member and a part of the base vehicle part.

Typically, the inter-connecting member is affixed to the upper vehicle part with a first tightening torque and the releasable fixation support is affixed to the upper vehicle part with a second tightening torque, the second tightening torque being substantially lower than the first tightening torque.

According to one example embodiment, the base vehicle frame comprises a fixation member for preventing a displacement of the releasable fixation support in a direction perpendicular to a length direction of the releasable fixation support.

According to a second aspect of the present invention, there is provided a vehicle rollover protection system comprising an assembly according to any one of the example embodiments described above in relation to the first aspect. Moreover, the upper vehicle part is a vehicle cab and the base vehicle part is a vehicle frame structure.

According to one example embodiment, the vehicle rollover protection system further comprises a vibration dampening element arranged on the base vehicle part. The vibration dampening element is configured to suspend movement of the vehicle cab relative the vehicle frame structure.

Further, the vibration dampening element is arranged on top of a portion of the releasable fixation support.

Effects and features of the second aspect are largely analogous to those described above in relation to the first aspect.

According to a third aspect of the present invention, there is provided a vehicle, in particular a working machines, such as an articulated hauler, comprising an assembly according to any one of the example embodiments described above in relation to the first aspect and/or a system according to any one of the example embodiments described above in relation to the second aspect.

Effects and features of the third aspect are largely analogous to those described above in relation to the first aspect and/or second aspects.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
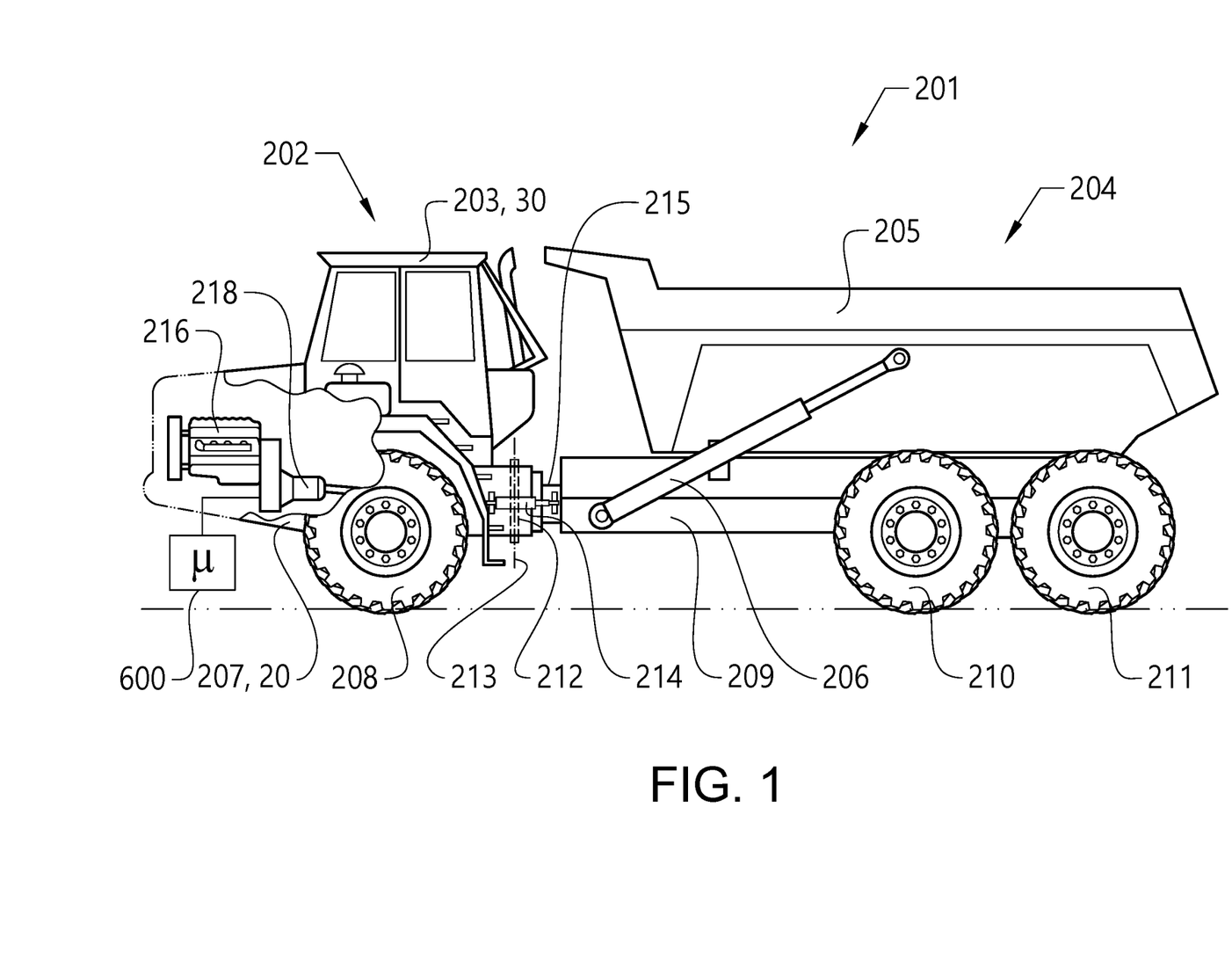
FIG. 1 is a lateral side view illustrating an example of working machine in the form of an articulated hauler; the working machine comprising an assembly according to one example embodiment of the present invention.

FIG. 1 is a side view of a working machine 201 in the form of an articulated hauler having a tractor unit 202 with a cab 203 for a driver and a trailer unit 204 with a platform having a dump body 205, here in the form of a container, arranged thereon, for receiving load. The cab 203 typically corresponds to or includes a cab vehicle part, which herein often is referred to as an upper vehicle part 30. The cab vehicle part is designed to delimits the working area of the driver. The dump body 205 is typically pivotally connected to the rear section and tiltable by means of a pair of tilting cylinders 206, for example hydraulic cylinders. The tractor unit 202 has a frame 207 and a pair of wheels 208 suspended from the frame 207. The frame 207 typically corresponds to or includes a frame vehicle part, which herein is referred to as a base vehicle part 20. The trailer unit 204 has a frame 209 and two pair of wheels 210, 211 suspended from the frame 209.

The working machine is frame-steered, i.e. there is a joint arrangement 212 connecting the tractor unit 202 and the trailer unit 204 of the working machine 201. The tractor unit 202 and the trailer unit 204 are pivotally connected to each other for pivoting around a substantially vertical pivot axis 213.

The working machine typically comprises a hydraulic system having two hydraulic cylinders 214, steering cylinders, arranged on opposite sides of the working machine for turning the working machine by means of relative movement of the tractor unit 202 and the trailer unit 204. The hydraulic cylinders can, however, be replaced by any other linear actuator for steering the machine, such as an electro-mechanical linear actuator.

Furthermore, the articulated hauler comprises a prime mover 216, here illustrated as an internal combustion engine, and a gearbox 218 having a transmission arrangement configured to obtain a set of gears. These parts of the articulated hauler are well-known and can be provided in several different ways depending on type of vehicle and type of driving condition. As these parts of the vehicle are well-known components, they will not be further described herein.

Furthermore, the articulated hauler in this example comprises a control unit 600 for controlling some of the components in the vehicle, and the interaction between the components, e.g. the control unit may be configured to control the gearbox or any other part of the vehicle. In some examples, the control unit may comprise one or more sub-control units in communication with each other. In other words, the control unit 600 may be, or form part of, already existing control units for controlling the vehicle or parts of the vehicle.

In addition, as mentioned above, the articulated hauler in FIG. 1 comprises the upper vehicle part 30 and the base vehicle part 20. It should be readily appreciated that throughout the description of the example embodiments of the present invention, the upper vehicle part may sometimes be referred to as the cab part, the cab vehicle part, the cab upper vehicle part or simply as the cab or the like. Analogously, the base vehicle part may sometimes be referred to as the base part, the frame vehicle part, the frame base vehicle part or simply as the frame or the like.

Moreover, as illustrated in FIG. 1, the articulated hauler comprises an assembly 10 according to an example embodiment of the present invention. The assembly 10 is described in further detail with reference to FIGS. 2a-2b, 3a-3e, and 4a-4b.

For the sake of facilitating the understanding of some example embodiments of the invention, the example of the vehicle 201 in FIG. 1 is illustrated in the form of an articulated hauler 201, and the following example embodiments of the invention are described based on an exemplary articulated hauler to illustrate the configuration of the assembly 10. However, such does not mean that the invention will be limited to an installation of the assembly in an articulated hauler. In contrary, the vehicle may be any type of working machine intended for carrying out an operation and for utilizing the assembly 10 both in case of a roll over protection situation and/or in a service operation or the like. It should also be readily appreciated that throughout the description of the example embodiments of the present invention, the articulated hauler may sometimes be referred to as the vehicle, the working machine or simply as the machine, the hauler, hauler vehicle or the like.

Figure 2A:
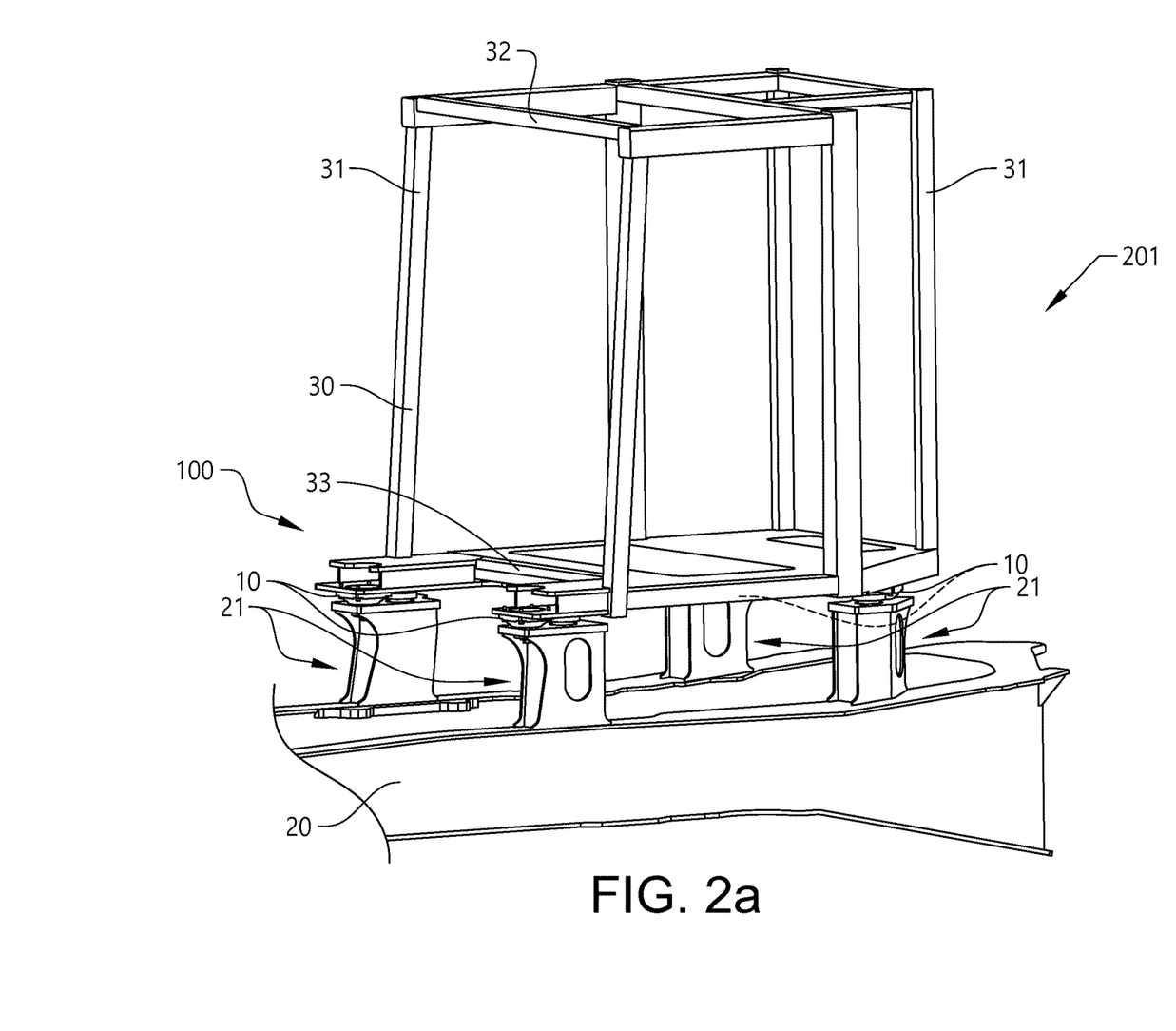
FIGS. 2a-2b schematically illustrate parts of an example embodiment of an upper vehicle part engaged with a base vehicle part of the vehicle in FIG. 1, thereby forming an assembly according to the present invention, and in which the parts are engaged by means of securing assembly.
Figure 2B:
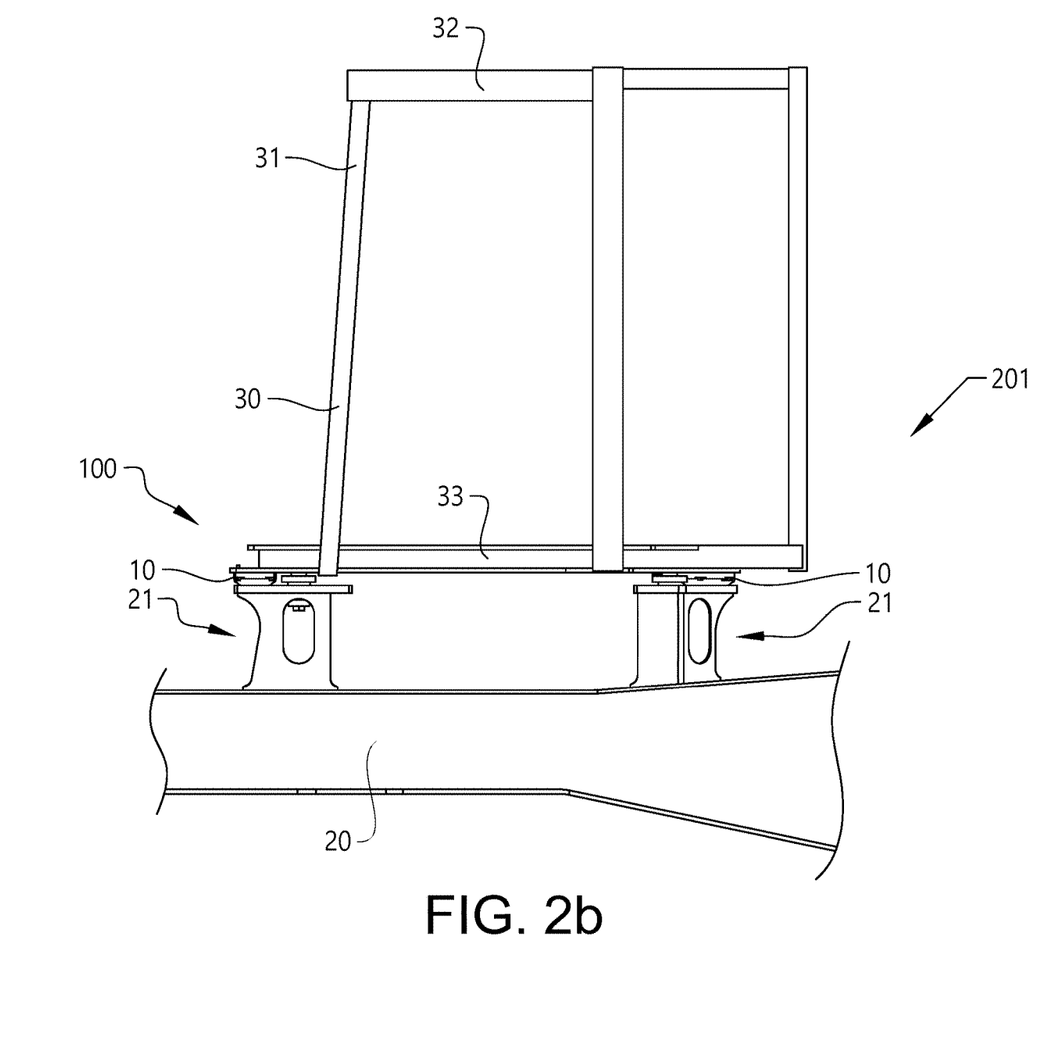

Now with reference to FIGS. 2a and 2b, an example embodiment of an assembly according to the present invention is illustrated. The assembly 10 is intended for releasably engaging the upper vehicle part 30 with the base vehicle part 20, as described in relation to FIG. 1. Further, the assembly 10 is intended to be used in a rollover protection system of a vehicle. Thus, there is also provided a vehicle rollover protection system 100 comprising the assembly 10 according to any one of the example embodiments as described below in relation to the FIGS. 3a-3e and 4a-4b, and in which the upper vehicle part is a vehicle cab and the base vehicle part is a vehicle frame structure.

The assembly 10 typically extends in a longitudinal (length) direction X, a transverse (width) direction Y and in a vertical (height) direction Z. As shown in the figures, the directions forms a conventional coordinate system, i.e. the three coordinate axes are given, each perpendicular to the other two at the origin, the point at which they cross. In other words, the longitudinal direction is perpendicular to the transverse direction. Analogously, the longitudinal direction is perpendicular to the vertical direction. Analogously, the vertical direction is perpendicular to the transverse direction.

It should be noted that the terms top, above, upper, upward, below, lower, base, downward and bottom, as well as any other similar terms are used in reference to the position of the assembly 10 as depicted in the drawings and the assembly may be positioned and used in other orientations. In addition, the term side, or laterally and other similar terms refers to the direction parallel to the transverse direction Y assembly 10.

As depicted in FIGS. 2a and 2b, the cab upper vehicle part 30 is constructed of a plurality of long construction elements 31, exemplified as girders. These elements are joined or connected to each other to form a rectangular box shape. In other words, the cab upper vehicle part 30 is in the shape of a perpendicular block or box. In particular, six vertical long construction elements 31 are arranged in such a way that they delimit the corners of the perpendicular block. Additional long construction elements delimit a horizontal upper plane 32 and lower plane 33. The cab upper vehicle part comprises, in addition, elements (not shown in FIGS. 2a and 2b) for damping shocks, noise and the like from the frame 20 of the vehicle. In particular, the cab upper vehicle part 30 has a vibration dampening element 70, as shown in e.g. FIGS. 3a and 3b. The damping elements consist of rubber insulators that are arranged at the floor level of the cab upper vehicle part, below the lower plane 33. Typically, although not strictly required, there are four connection points between the cab upper vehicle part 30 and the base vehicle part 20, as illustrated in FIGS. 2a and 2b. Hence, in a working machine such as an articulated hauler, there are four dampening elements 70 arranged between the cab upper vehicle part 30 and the base vehicle part 20. That is, two connection points in front of the cab 30 and two connection points at the rear of the cab 30. However, the number of connection points may vary depending on type of vehicle and installation. In one example embodiment, (not shown), there is only one connection point arranged between the cab upper vehicle part 30 and the base vehicle part 20.

In between the cab upper vehicle part 30 and the base vehicle part 20, there is provided an assembly 10 comprising a securing assembly 40, as further described hereinafter, and which is depicted in e.g. FIGS. 3a-3e. Parts of the assembly 10 are typically configured to absorb forces and, in conjunction with the cab upper vehicle part 30, form a sufficiently strong construction to fulfill the ROPS requirement.

In other words, in this example embodiment, as depicted in the FIGS. 2a and 2b, the connection point between the cab upper vehicle part 30 and the base vehicle part 20 is formed by parts of the assembly 10 comprising the securing assembly 40.

Typically, although not strictly required, there are four assemblies 10, one for each connection points, between the cab upper vehicle part 30 and the base vehicle part 20, as illustrated in FIGS. 2a and 2b. Hence, in a working machine such as an articulated hauler, there are four assemblies 10 arranged between the cab upper vehicle part 30 and the base vehicle part 20. That is, two assemblies 10 in front of the cab 30 and two assemblies 10 at the rear of the cab 30. However, the number of assemblies 10 may vary depending on type of vehicle and installation. In one example embodiment (not shown), there is only one assemblies 10 arranged between the cab upper vehicle part 30 and the base vehicle part 20. It should also be noted that the connection points and the assemblies are typically only accessible from a side of the vehicle (machine) during assembly of the components and the vehicle, while for service during ordinary use of the vehicle (when the vehicle is fully assembled) these connections points may only be accessible from an inside of an engine compartment and/or from a rear side of the vehicle (machine). Thus, there is a need for providing an assembly that facilitates service and maintenance of the assembly and the components making up the roll over protection system, as well as components of the cab upper vehicle part and the base vehicle part. The assembly 10 according to the example embodiments is configured to releasably engage the cab upper vehicle part and the base vehicle part by means of the securing assembly configuration as described below. Hence, when the cab upper vehicle part is disengaged from the base vehicle part, the assembly 10 provides a configuration facilitating service and maintenance of the vehicle (machine).

In an active mode, also corresponding to the operational state, the assembly 10 is arranged to provide a force-transmitting connection between the cab upper vehicle part 30 and the base vehicle part 20. In the operational state, the vehicle may also occasionally be driven in such a way that a certain inclination or canting of the cab upper vehicle part is exceeded, thus requiring use of the roll over protection system. In other words, the assembly is intended to provide a secure connection both during normal vehicle driving, but also during an extreme situation such as the roll over incident.

Therefore, the term "operational state" refers to a normal mode of vehicle operation in which the vehicle is assembled, thus the upper vehicle part 30 is engaged to the base vehicle part 20. Typically, the term "operational state" also includes a vehicle state, in which the vehicle may exceed an inclination limit or otherwise being excessively canted or tilted from a horizontal orientation. For this reason, the term "non-operational state", as used herein, refers to a state in which the upper vehicle part 30 is essentially disengaged from the base vehicle part 20.

Referring again to the vibration dampening element, it should be noted that this part is typically included in the vehicle rollover protection system 100. Thus, the vehicle rollover protection system 100 may further comprise the vibration dampening element 70 arranged on the frame base vehicle part 20 and configured to suspend movement of the cab upper vehicle part 30 relative the vehicle frame base structure 20.

Turning now to FIG. 2a, there is depicted an example embodiment of the assembly 10, which comprises the upper vehicle part 30 and the base vehicle part 20. As mentioned above, in this example embodiment, the upper vehicle part 30 corresponds to the vehicle cab and the base vehicle part 20 corresponds to the vehicle frame structure. Thus, throughout the following description of the example embodiment of the assembly, it should be readily appreciated that the upper vehicle part typically refers to the vehicle cab, while the base vehicle part refers to the vehicle frame structure, as described above.

Figure 3A:
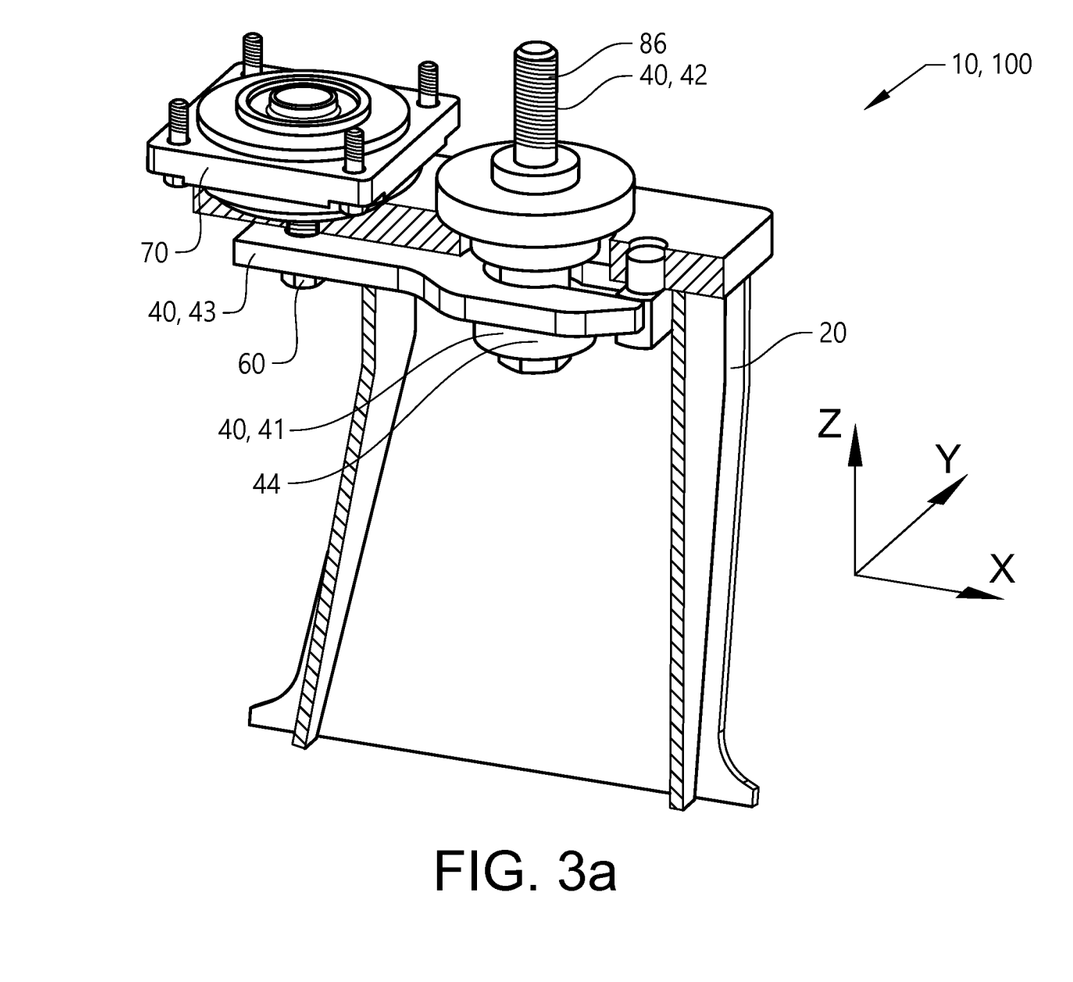
FIGS. 3a-3e schematically illustrate further parts of an example embodiment of the assembly according to the present invention, and as depicted in FIGS. 2a-2b, in which the assembly comprises a securing assembly for releasably engaging the upper vehicle part with the base vehicle part.

In addition, as is partly depicted in FIG. 3a, the assembly 10 comprises a securing assembly 40 for ensuring that the upper vehicle part is secured to the base vehicle part in the operational state of the vehicle. The securing assembly 40, according to one example as depicted in e.g. FIGS. 2a-2b and FIGS. 3a-3e, comprises an inter-connecting member having a body portion 42 and a projecting portion 41, and a releasable fixation support 43.

Figure 4A:
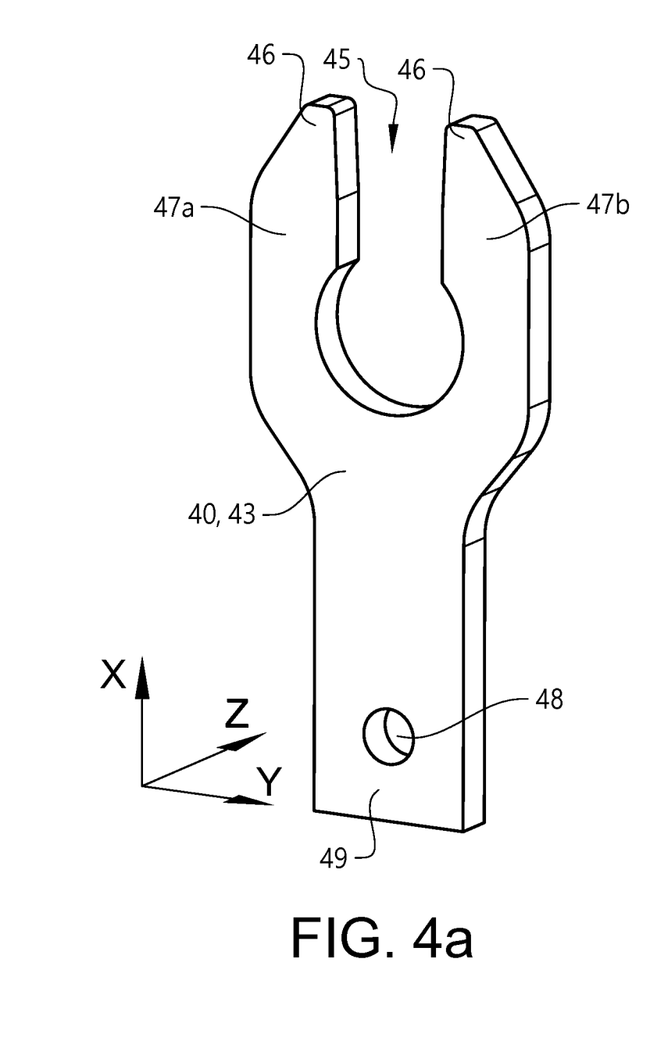
FIG. 4a schematically illustrates one example embodiment of a releasable fixation support of the assembly according to the present invention.
Figure 4B:
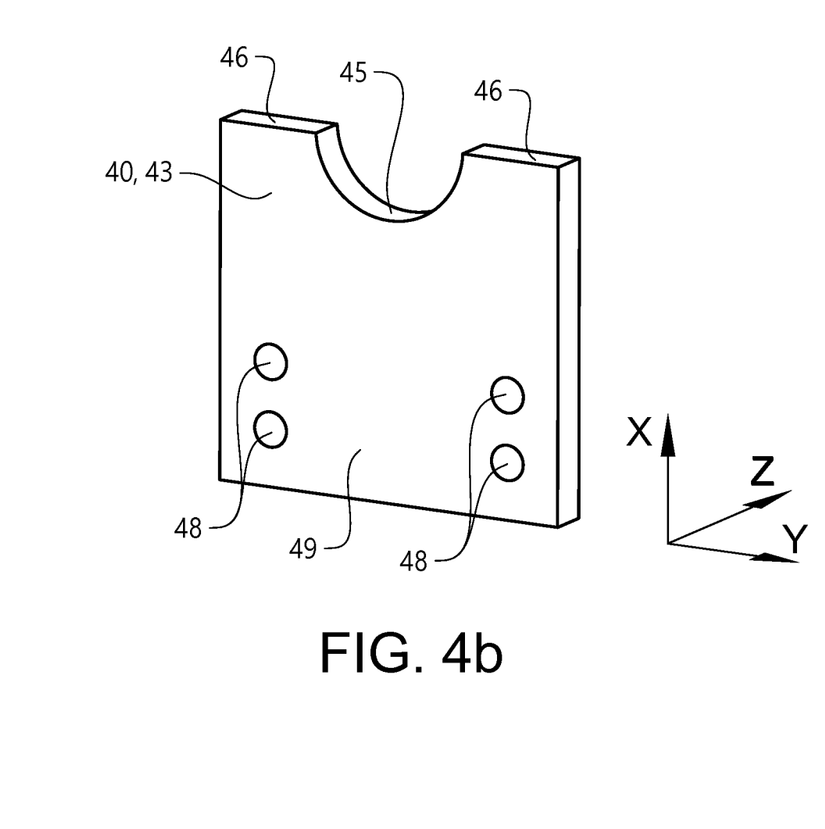
FIG. 4b schematically illustrates another example embodiment of a releasable fixation support of the assembly according to the present invention.

The securing assembly 40 can be provided in several different variants. Some parts of some variants of the securing assembly are illustrated in FIGS. 4a and 4b.

Referring again to the example embodiment as described in relation to FIGS. 2a-2b and FIGS. 3a-3e, the securing assembly comprises the inter-connecting member 41, 42 adapted to extend from the upper vehicle part 30 to the base vehicle part 20 in the operational state, as mentioned above.

Figure 3B:
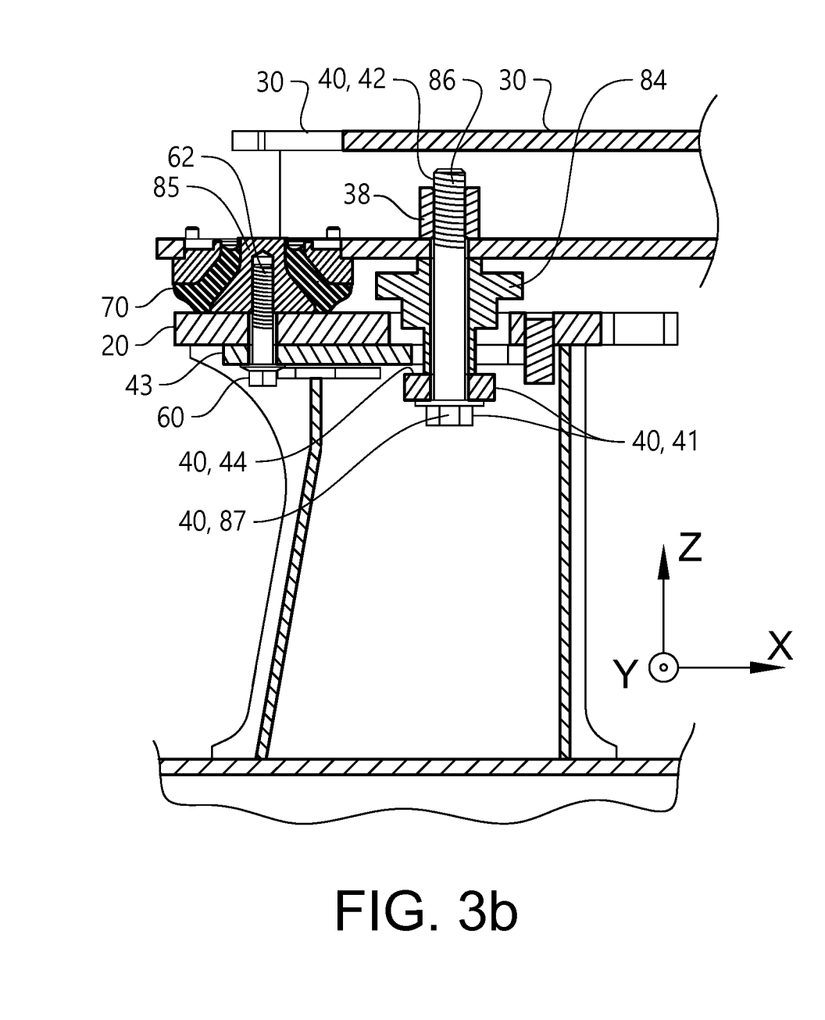
Figure 3C:
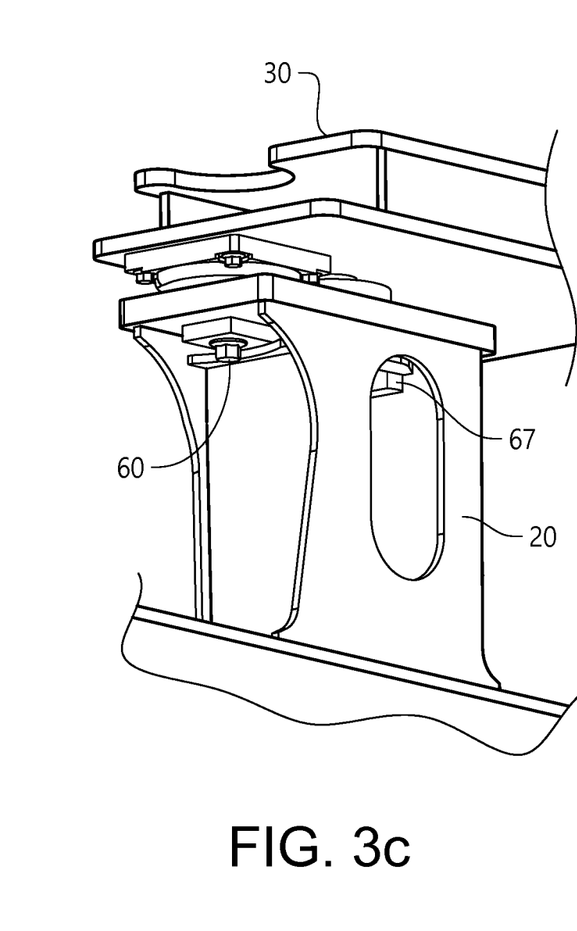
Figure 3D:
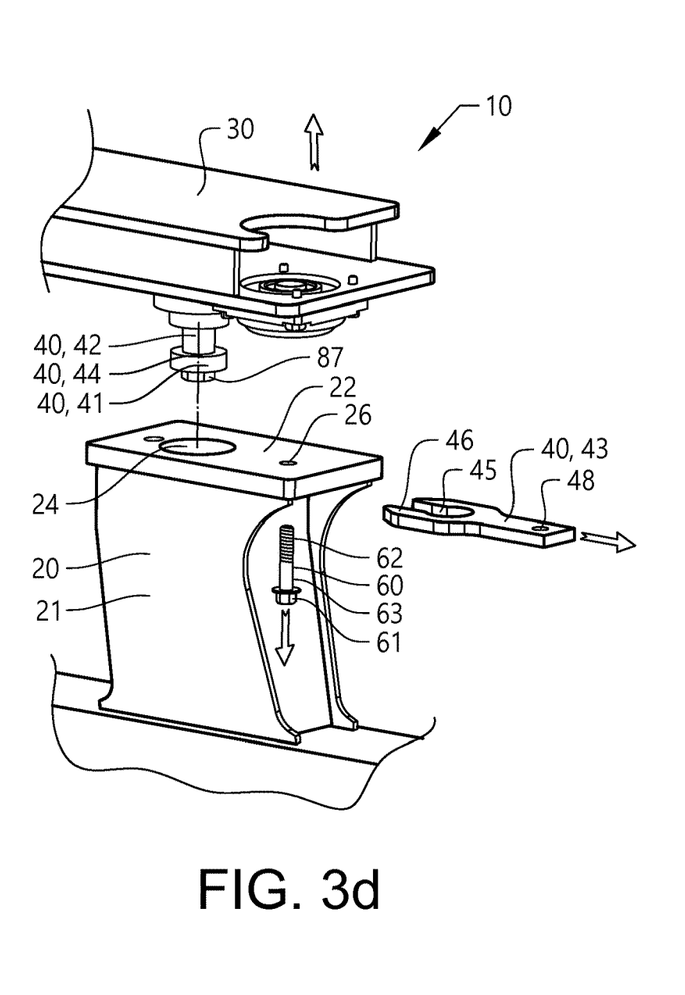
Figure 3E:
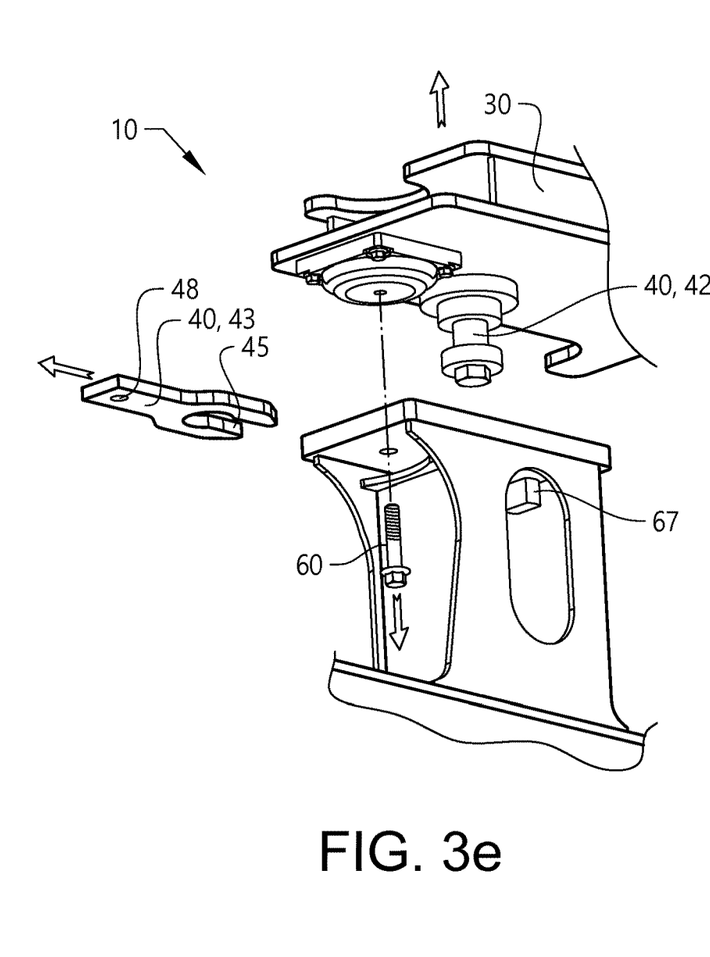

In particular, FIG. 3a is a partly cross-sectional view of the assembly as depicted in FIGS. 2a-2b, when the assembly and the securing assembly are in the operational state, i.e. when the upper vehicle part is engaged with the base vehicle part. FIG. 3b is a cross-sectional view of the assembly as depicted in FIGS. 2a-2b, when the assembly and the securing assembly are in the operational state, i.e. when the upper vehicle part is engaged with the base vehicle part. FIG. 3c is a perspective view of the assembly as depicted in FIG. 3a, i.e. when the assembly and the securing assembly are in the operational state. FIGS. 3d and 3e are perspective views of the assembly as depicted in FIGS. 2a-2b, when the assembly and the securing assembly are in the non-operational state, i.e. when the upper vehicle part is disengaged with the base vehicle part.

Typically, the inter-connecting member 41, 42 is affixed to the upper vehicle part with a first tightening torque. By way of example, as described below, the inter-connecting member 41, 42 is affixed to the upper vehicle part 30 with the first tightening torque by means of a screw connection.

Further, as mentioned above, the inter-connecting member comprises the body portion 42 and the projecting portion 41 defining an abutment surface 44, which is illustrated in e.g. FIG. 3b.

Moreover, as mentioned above, the securing assembly 40 further comprises a releasable fixation support 43 which is adapted at one end 49 to be releasably affixed to one of the upper vehicle part 30 and the base vehicle part 20. Typically, the releasable fixation support 43 is affixed to the upper vehicle part with a second tightening torque at the one end 49. By way of example, as described below, the releasable fixation support 43 is affixed to the upper vehicle part with the second tightening torque at the one end 49 by means of a screw connection.

The various torques may vary depending on type of vehicle and type of installation. By way of example, the first tightening torque may range between 400-600 Nm, while the second tightening torque may range between 50-275 Nm. Preferably, the first tightening torque may range between 500-550 Nm, while the second tightening torque may range between 100-250 Nm. Still preferably, the first tightening torque may range between 520-540 Nm, while the second tightening torque may range between 115-230 Nm.

As depicted in e.g. FIGS. 3d and 3e, the releasable fixation support 43 further has a recess 45 with an open end at a second end 46.

The recess 45 is adapted to accommodate a part of the body portion 42 of the inter-connecting member. That is, the recess 45 accommodates a part of the body portion 42 of the inter-connecting member when the assembly is in its operation state. Further, the recess 45 is typically adapted to receive the part of the body portion 42 of the inter-connecting member when the releasable fixation support 43 moved towards the body portion 42. As illustrated in the FIGS. 3a-3e, and also in e.g. FIG. 4a, the recess extends at least partly in a length direction X to permit removal of the releasable fixation support from the inter-connecting member upon a movement of the releasable fixation support in a direction opposite the open end of the recess. The direction opposite the open end of the recess typically corresponds to a direction along the length direction X.

In addition, as depicted in the FIGS. 3a-3e, another part 47a, 47b of the second end of the releasable fixation support 43 is capable of restricting displacement of the inter-connecting member in a direction towards the upper part vehicle 30 by engaging with the abutment surface 44 of the projecting portion 42 in the operational state. In other words, part 47a, 47b of the second end of the releasable fixation support 43 is capable of restricting displacement of the inter-connecting member along the vertical direction Z towards the upper part vehicle 30 by engaging with the abutment surface 44 of the projecting portion 42 in the operational state.

Referring again to the inter-connecting member, the inter-connecting member typically comprises the body portion 42 and the projecting portion 41. The projecting portion in this example is connected to the body portion. In addition the body portion has a first radius that is less than the radius of the projecting portion. The difference in radius form the abutment surface 44. In other words, the radial dimension of the projecting portion 41 is greater than the radial dimension of the body portion 42, as depicted in FIG. 3d. The difference in radial dimensions between the body portion 42 and the projecting portion 41 forms the abutment surface 44.

In addition, the abutment surface 44 typically extends a substantial part in the radial direction of the inter-connecting member, as depicted in e.g. FIG. 3d. In other words, when the inter-connecting member is in the engaged state (corresponding to the operational state of the assembly) with the upper vehicle part 30, the abutment surface 44 typically extends a substantial part in the length direction X, as depicted in e.g. FIGS. 3b and 3d. Also, when the inter-connecting member is in the engaged state (corresponding to the operational state of the assembly) with the upper vehicle part 30, the abutment surface 44 is arranged to face the upper vehicle part 30, i.e. the abutment surface 44 is oriented towards the upper vehicle part.

Accordingly, as will be readily appreciated from the description herein, when the releasable fixation support 43 is arranged to engage with the abutment surface 44 of the inter-connecting member in the operational state of the assembly, the abutment surface 44 is oriented towards the part 47a, 47b of the second end of the releasable fixation support 43.

The upper vehicle part 30 and the base vehicle part 20 are maintained in the engaged state by the securing assembly 40. That is, the upper vehicle part and the base vehicle part are maintained in the engaged state when the securing assembly 40 is in the operational state. The operational state of the vehicle, and thus the operational state of the assembly 10, and thus the operation state of the securing assembly is depicted in e.g. FIGS. 3a-3c.

The release of the upper vehicle part 30 and the base vehicle part 20 relative each other is obtained by setting the securing assembly in its non-operational state. The operational state of the securing assembly is depicted in FIGS. 3d and 3e. For instance, the release of the upper vehicle part and the base vehicle part relative each other is obtained by disengaging the releasable fixation support from the inter-connecting member 41, 42, and typically from the fastening member 60. When the securing assembly 40 is in its non-operational state, the upper vehicle part 30 can be released from the base vehicle part 20 so as to undergo maintenance service in easy manner. An example of the upper vehicle part 30 being released from the base vehicle part 20 is shown in FIGS. 3d and 3e.

FIG. 4a illustrates one example of a releasable fixation support. This example of the releasable fixation support 43 can be used in the securing assembly 40 described in relation to the FIGS. 3a-3e. In this example embodiment, as also partly depicted in the FIGS. 3a-3e, the releasable fixation support resembles a fork plate having opposite arranged end projecting parts 47a and 47b defining the recess 45 there between with the open end at the second end 46. The open-ended recess 45 is adapted to accommodate the part of the body portion 42 of the inter-connecting member. In this manner, the projecting portion 41 of the inter-connecting member 41, 42 is restrained from passing through an opening (hole 24) in the base vehicle part 20 by the opposite arranged end projecting parts 47a and 47b of the fork plate. That is, the end projecting parts 47a and 47b of the fork plate are adapted to be in contact with the abutment surface 44 when the assembly 10 is in the operational state. As mentioned above, the recess may be dimensioned in several different ways. Optional, as depicted in FIG. 4a, the recess has a slightly larger dimension near the center of the fixation support 43.

The base vehicle part 20 can also be designed in several different ways. In one example, as depicted in the FIGS. 2a-2b and FIGS. 3a-3e, the base vehicle part has a supporting structure 21 comprising a support plate 22. In addition, as illustrated in e.g. FIG. 3d, the support plate 22 has a first through-bore 24 and a second through bore 26. The first through-bore 24 is configured to receive a portion of the inter-connecting member 42. In particular, the first through-bore 24 is configured to receive a portion of the body portion 42 and the projecting portion 41. When the assembly 10 is in the operational state, the first through-bore 24 encircles a portion of the body portion 42 of the inter-connecting member. Hence, the cross sectional dimension of the body portion should be at least less than the cross sectional dimension of the first through-bore 24. By way of example, as depicted in e.g. FIG. 3d, the radius of the body portion should be at least less than the radius of the first through-bore 24. In addition, in order to permit the inter-connecting member to be inserted into the first through-bore 24, the cross sectional dimension of the projecting portion 41 should be at least less than the cross sectional dimension of the first through-bore 24. By way of example, as depicted in e.g. FIG. 3d, the radius of the projecting portion should be at least less than the radius of the first through-bore 24.

Referring now again to the inter-connecting member 41, 42, which is a part of the assembly 10 and the securing assembly 40, it can be seen in e.g. FIG. 3b that the projecting portion 41 defining the abutment surface 44 is arranged downward of the support plate 22 when the securing assembly is in the operational state. In addition, the projecting portion 41 defining the abutment surface 44 is arranged downward of the releasable fixation support 43 when the securing assembly is in the operational state. Therefore, as the cross section dimension of the recess 45 of the releasable fixation support 43 is less than the cross section dimension of the projecting portion 41, the second end 46 of the releasable fixation support restricts displacement of the inter-connecting member 41, 42 in a direction towards the upper part vehicle 30 by engaging with the abutment surface 44 of the projecting portion 41 when the securing assembly 40 is in the operational state. In this manner, the projecting portion 41 of the portion 40 cannot pass through the smaller dimensioned recess 45 of the releasable fixation support 43. To this end, the releasable fixation support 43 via the second end 46 functions as stopper. In particular, the abutment surface 44 of the projecting portion 41 is contact with the second end 46 of the releasable fixation support 43 when the securing assembly 40 is in the operational state.

As such, when the releasable fixation support 43 is in the operational state relative the inter-connecting member 41, 42, the releasable fixation support 43 is arranged in-between the projecting portion 41 of the inter-connecting member and a part of the base vehicle part 20, e.g. the support plate 22 of the base vehicle part 20.

As mentioned above, the inter-connecting member resembles a bolt member composed of the body portion 42 and the projecting portion 41. The body portion is fastened on the cab upper vehicle part 30. In addition, the inter-connecting member in this example has a head portion 87 (an outermost portion) adapted for engaging with a driving tool to rotate the inter-connecting member in a rotational direction around a rotational axis of the inter-connecting member 41, 42 so as to engage the inter-connecting member with the cab upper vehicle frame 30. It should be appreciated that the inter-connecting member may have other portions or shapes being adapted to function as means for engaging the inter-connecting member with the cab upper vehicle frame 30. Also, in some design variants, the inter-connecting member 41, 42 may be engaged with the cab upper vehicle frame by rotating the projecting portion 41 with a tool until the inter-connecting member is fastened or engaged to the cab upper vehicle frame. Thus, the head portion in e.g. FIG. 3b is only one of many conceivable means for cooperating with tool for engaging the inter-connecting member to the cab upper vehicle part 30.

Referring again to the second through-bore 26 disposed in the base vehicle frame 20, in particular in the support plate 22. As depicted in e.g. FIG. 3d, the second through-bore 26 is configured to receive a portion of the fastening member 60. In particular, the second through-bore 26 is configured to receive a portion of a body portion 63 of the fastening member 60. When the assembly 10 is in the operational state, the second through-bore 26 encircles a portion of the fastening member 60, e.g. a portion of the body portion of the fastening member, which is depicted in e.g. FIG. 3b. Hence, the cross sectional dimension of the body portion 63 of the fastening member 60 designed for being encircled by the bore 26 should be at least less than the cross sectional dimension of the second through-bore 26. By way of example, as depicted in e.g. FIG. 3d, the radius of the body portion of the fastening member 60 should be at least less than the radius of the second through-bore 26. In addition, in this example, in order to ensure that the fastening member can fasten the releasable fixation support 43 to the base vehicle part, a head portion 61 of the fastening member 60 should be larger than the hole 48 of the releasable fixation support 43. Typically, the head portion 61 of the fastening member 60 should be larger than the second through-bore 26 of the support plate 22 of the base vehicle part 20. By way of example, the body portion 63 of the fastening member 60 that is to be inserted into the hole 48 of the releasable fixation support 43 should have a dimension less than the hole 48 and less than the through-bore 26. That is, the cross sectional dimension of the body portion 63 should be at least less than the cross sectional dimension of the second through-bore 26. By way of example, as depicted in e.g. FIG. 3d, the radius of the body portion 63 should be at least less than the radius of the second through-bore 26.

In addition, as depicted in e.g. FIG. 3b, the head portion 61 of the fastening member 60 is arranged downward of the support plate 22 when the securing assembly 40 is in the operational state. In addition, the head portion 61 is arranged downward of the releasable fixation support 43 when the securing assembly 40 is in the operational state. In other words, as the cross section dimension of the hole 48 of the releasable fixation support 43 is less than the cross section dimension of the head portion 61, the first end 49 of the releasable fixation support is affixed to the base vehicle part and the upper vehicle part 20 in the operational state of the securing assembly 40. Typically, the head portion 61 has an abutment surface being in contact with the first end 49 of the releasable fixation support 43 when the securing assembly 40 is in the operational state. As such, when the releasable fixation support 43 is in the operational state relative the inter-connecting member 41, 42, the first end 49 of the releasable fixation support 43 is arranged in-between the head portion 61 of the fastening member 60 and the base vehicle part 20.

As illustrated in FIGS. 3d and 3e, the releasable fixation support 43 is also adapted to release from one of the upper vehicle part and the base vehicle in the non-operational state. In this manner, the releasable fixation support is permitted to disengage from the inter-connecting member in the non-operational state such that the projecting portion 41 of the inter-connecting member is permitted to displace in the direction towards the upper vehicle, typically corresponding to the vertical direction Z.

However, when the releasable fixation support 43 is in the operational state relative the inter-connecting member, the releasable fixation support 43 is arranged in-between the projecting portion 41 of the inter-connecting member and a part of the base vehicle part 20. In particular, when the releasable fixation support 43 is in the operational state relative the inter-connecting member, the releasable fixation support 43 is arranged in-between the projecting portion 41 of the inter-connecting member and the support plate 22 of the base vehicle part 20. The upper vehicle part 30 and the base vehicle part 20 are thus maintained in the engaged state by the securing assembly. That is, the upper vehicle part 30 and the base vehicle part 20 are maintained in the engaged state when the securing assembly 40 is in the operational state. The release of the upper vehicle part 30 and the base vehicle part 20 relative each other is then obtained by setting the securing assembly 40 in its non-operational state. For instance, the release of the upper vehicle part and the base vehicle part relative each other is obtained by disengaging the releasable fixation support from the inter-connecting member, and typically from the fastening member, as mentioned herein. Typically, as depicted in FIGS. 3d-3e, the release of the upper vehicle part 30 and the base vehicle part 20 relative each other is obtained by releasing the releasable fixation support 43 from the affixation to the upper vehicle part 30 by removing the fastening member 60 from the upper vehicle part 30, and subsequently disengaging and removing the releasable fixation support 43 from the inter-connecting member, as depicted by the arrows in FIGS. 3d and 3e.

As mentioned above, in order to provide a secure fastening of the securing assembly during operation of the vehicle, the securing assembly should be affixed to at least one of the upper and base vehicle parts. Thus, as shown in e.g. FIG. 3a, the securing assembly comprises the fastening member 60. The fastening member 60 is configured to releasably affix the one end 49 of the releasable fixation support 43 to one of the upper vehicle part and the base vehicle part.

In addition, in this example of the assembly, the releasable fixation support 43 is non-rotational affixed to one of the upper vehicle part and the base vehicle part. By way of example, the non-rotational affixation is provided by the elongated fastening member 60. In another design variant, the non-rotational affixation is further provided by an additional fixation member 67, which is further described below.

It should be readily appreciated that the releasable fixation support can be affixed to one of the upper and base vehicle parts by several different types of fastening members. In the example embodiment described in relation to FIGS. 2a-2b and 3a-3e, the releasable fixation support is affixed to one of the cab upper vehicle part 30 and the frame base vehicle part 20 by an elongated fastening member 60. The elongated fastening member is typically, although not strictly necessary a screw connection, e.g. a bolt. However, in other design variants, the elongated fastening member may be another type of locking arrangement.

In the example embodiment described in relation to FIGS. 2a-2b, 3a-3e, the releasable fixation support 43 is affixed to the cab upper vehicle part 30 by the elongated fastening member 60. As the base frame vehicle part 20 is arranged in-between the head portion of the fastening member and the cab vehicle upper part, the friction obtained by the screw connection between the fastening member 60 and the cab upper vehicle part 30 ensures that the cab upper vehicle part 30 and the frame base vehicle 20 are in the engaged state with each other. As such, since the releasable fixation support 43 in the operational state also is operatively engaged to the frame base vehicle part 20, as shown in FIG. 3b, the securing assembly 40 provides an engagement between the cab upper vehicle part 30 and the frame base vehicle 20 (in the operational state). In this context, the term operatively engaged means that the releasable fixation support 43 is arranged to contact the abutment surface 44 of the inter-connecting member.

As mentioned above, the releasable fixation support 43 is affixed to the upper vehicle part with the second tightening torque at the one end 49. The releasable fixation support end 49 can be affixed to the upper vehicle part with the second tightening torque in several different ways. In this example embodiment, the releasable fixation support end 49 is fastened to the upper vehicle part 30 with the fastening member 60. The fastening member 60 has a threaded part to engage with a corresponding threaded part on the upper vehicle part upon a rotation of the fastening member 60 relative the upper vehicle part, as shown in FIG. 3*b*. Thus, while referring to the example in FIGS. 3*a* and 3*b*, the fastening member 60 at one end is provided with a thread 62. The thread is typically disposed on the body part of the fastening member 60. The thread 62 is configured to be operatively attached to the cab upper vehicle part 30. In particular, the cab vehicle part includes a first tubular spacer 85 having a corresponding inner thread (not shown). The inner thread is configured to operatively engage with the thread 62 of the fastening member 60. In other words, the thread 62 of the fastening member 60 is configured to be operatively attached to the inner thread of the first tubular spacer 85 of the cab vehicle part 30.

In other words, the fastening member 60 in this example resembles a bolt member composed of the body portion 63 and the head portion 61. The body portion is fastened on the cab upper vehicle part 30. In addition, the fastening member 60 in this example the head portion 61 is adapted for engaging with a driving tool to rotate the fastening member 60 in a rotational direction around a rotational axis of the fastening member 60 so as to engage the fastening member 60 with the cab upper vehicle frame 30. It should be appreciated that the fastening member 60 may have other portions or shapes being adapted to function as means for engaging the fastening member 60 with the cab upper vehicle frame 30. Thus, the head portion 61 as shown in e.g. FIG. 3*b* is only one of many conceivable means for cooperating with a tool for engaging the fastening member 60 to the cab upper vehicle part 30.

As mentioned above, the inter-connecting member 41, 42 is affixed to the upper vehicle part with the first tightening torque. The inter-connecting member 41, 42 can be affixed to the upper vehicle part with the first tightening torque in several different ways. In this example embodiment, the body portion 42 has a threaded part to engage with a corresponding threaded part on the upper vehicle part upon a rotation of the body portion relative the upper vehicle part, as shown in FIG. 3*b*. Thus, while referring to the example in FIGS. 3*a* and 3*b*, the body portion 42 at one end is provided with a thread 86. The thread 86 is configured to be operatively attached to the cab vehicle part 30. In particular, the cab vehicle part includes a second tubular spacer 38 having a corresponding inner thread (not shown). The inner thread is configured to operatively engage with the thread 86 of the body portion. In other words, the thread 86 of the body portion 42 is configured to be operatively attached to the inner thread of the second tubular spacer 38 of the cab vehicle part 30.

Optionally, there is provided another tubular spacer 84, a third tubular spacer, about a part of the body portion 42, which is depicted e.g. in FIG. 3*b*. Therefore, the securing assembly 40 in this example embodiment further comprises the third tubular spacer. The third tubular spacer 84 is arranged in-between the cab vehicle part 30 and the projecting portion 41 of the inter-connecting member. By way of example, the third tubular spacer 84 is arranged in-between a lower surface of the cab vehicle part 30 and the abutment surface 44 of the projecting portion 41 of the inter-connecting member, as depicted in FIG. 3*b*. In this manner, it becomes possible to further improve the engagement between the upper vehicle part and the base vehicle part, and to secure that the components are engaged with each other in a reliable manner during an operational state of the vehicle and the assembly.

In this example embodiment, the inter-connecting member is affixed to the upper vehicle part with a first tightening torque and the releasable fixation support is affixed to the upper vehicle part with a second tightening torque, the second tightening torque being substantially lower than the first tightening torque. The various torques may vary depending on type of vehicle and type of installation. By way of example, the first tightening torque may range between 400-600 Nm, while the second tightening torque may range between 50-275 Nm. Preferably, the first tightening torque may range between 500-550 Nm, while the second tightening torque may range between 100-250 Nm. Still preferably, the first tightening torque may range between 520-540 Nm, while the second tightening torque may range between 115-230 Nm.

Optionally, the base vehicle frame comprises a fixation member 67 for preventing a displacement of the releasable fixation support in the transverse direction Y being perpendicular to the length direction X of the releasable fixation support. The fixation member 67 is arranged on the base vehicle part 20, as depicted in e.g. FIG. 3*c*. The member 67 can be arranged on other locations as long as the member 67 is permitted to prevent a displacement of the releasable fixation support in the direction perpendicular to the length direction X of the releasable fixation support.

In addition, as mentioned above, the example embodiments of the assembly typically includes the vibration dampening element 70 arranged on the frame base vehicle part 20 and configured to suspend movement of the cab upper vehicle part 30 relative the vehicle frame base structure 20. As depicted in the FIGS. 3*a*-3*e*, the vibration dampening element 70 is arranged on top of a portion of the releasable fixation support 43. The vibration dampening element 70 may in some example be a separate part of the assembly 10. However, in other examples, the vibration dampening element 70 may be an integral part of any one of the vehicle parts 20 and 30. In this example, the vibration dampening element 70 is rotationally engaged with the cab upper vehicle part 20. Thus, the vibration dampening element 70 in the example depicted in FIG. 3*b* is configured to be engaged with the cab upper vehicle part 20. The vibration dampening element 70 is generally made of rubber, however, other dampening materials may likewise be conceivable.

Accordingly, when the cab upper vehicle part 20 is engaged with the base vehicle part 30 in the operational state of the assembly 10, the vibration dampening element 70 is arranged in contact with the base vehicle part 30.

Further, as depicted in FIG. 3*b*, the vibration dampening element 70 encircles the first tubular spacer 85, which encircles the fastening element 60, when the cab upper vehicle part 20 is engaged with the base vehicle part 30 in the operational state of the assembly.

Moreover, as mentioned above, there is depicted another example of a releasable fixation support 43 in FIG. 4*b*. in this example, the releasable fixation support 43 is provided in the form of a rectangular-shaped releasable fixation support. In addition, the recess 45 of the fixation support is shaped as a half circle. Moreover, the releasable fixation support 43 comprises a number of holes 48. By way of example, the releasable fixation support 43 comprises four holes 48. The example as depicted in FIG. 4*b* may include any other feature, aspect or function as described in relation to the fork plate shaped releasable fixation support 43, as described above in relation to FIGS. 3*a*-3*e* and 4*a*, as long as there are no contradiction between the features of the two example. The example in FIG. 4*b* may be installed in the assembly 10 as described in relation to FIGS. 2a-2b and 3a-3e, and as mentioned above.

In other words, it should be noted that the releasable fixation support 43 can be provided in several different designs and configuration as long as the support 43 is capable of providing the functions and effects as mentioned above with respect to the examples in FIGS. 4a and 4b, and the other Figures.

It is to be noted that any numerical designations, such as "first" or "second" are illustrative only and are not intended to limit the scope of the invention in any way.

It is to be understood that the present invention is not limited to the embodiments described above and illustrated in the drawings; rather, the skilled person will recognize that many changes and modifications may be made within the scope of the appended claims. For instance, it should be readily appreciated that although some components are mentioned as having circular cross sections, e.g. the fastening member, the inter-connecting member, the various bores and holes, the dimensions and shapes of these components may likewise be provided in other shapes and dimensions, such as components having cross sections resembling oval-, rectangular- and triangular-shaped cross sections, or any other conceivable cross-section, as long as the components can provided their functions.

The invention claimed is:

1. An assembly for releasably engaging an upper vehicle part with a base vehicle part of a vehicle, said assembly comprising said upper vehicle part, said base vehicle part and a securing assembly for ensuring that the upper vehicle part is secured to the base vehicle part in an operational state of the vehicle, said securing assembly comprising an inter-connecting member adapted to extend from the upper vehicle part to the base vehicle part in said operational state, said inter-connecting member having a body portion and a projecting portion defining an abutment surface,
   wherein said securing assembly further comprises a releasable fixation support adapted at a first end to be releasably affixed to one of the upper vehicle part and the base vehicle part and having a recess with an open end at a second end, said recess being adapted to accommodate a part of the body portion of the inter-connecting member, wherein another part of said second end of the releasable fixation support is capable of restricting displacement of said inter-connecting member in a direction towards said upper part vehicle by engaging with said abutment surface of said projecting portion in said operational state.

2. Assembly according to claim 1, wherein said releasable fixation support is adapted to release from one of the upper vehicle part and the base vehicle part in a non-operational state, thereby permitting the releasable fixation support to disengage from said inter-connecting member in said non-operational state such that said projecting portion of said inter-connecting member is permitted to displace in said direction towards said upper vehicle part.

3. Assembly according to claim 2, wherein said securing assembly comprises a fastening member, said fastening member is configured to releasably affix said first end of the fixation support to one of the upper vehicle part and the base vehicle part.

4. Assembly according to claim 3, wherein said releasable fixation support is non-rotational affixed to one of the upper vehicle part and the base vehicle part.

5. Assembly according to claim 3, wherein said releasable fixation support is affixed to one of the upper vehicle part and the base vehicle part by an elongated fastening member, such as a screw connection, e.g. a bolt.

6. Assembly according to claim 1, wherein said releasable fixation support resembles a fork plate having opposite arranged end projecting parts defining said recess there between with the open end at the second end of the fixation support, said recess is adapted to accommodate the part of the body portion of the inter-connecting member, whereby the projecting portion of the inter-connecting member is restrained from passing through an opening in the base vehicle part by said opposite arranged end projecting parts of said fork plate.

7. Assembly according to claim 1, wherein the recess extends at least partly in a length direction to permit removal of said releasable fixation support from said inter-connecting member upon a movement of said releasable fixation support in a direction opposite the open end of the recess.

8. Assembly according to claim 1, wherein, when said releasable fixation support is in said operational state relative the inter-connecting member, said releasable fixation support is arranged in-between the projecting portion of the inter-connecting member and a part of the base vehicle part.

9. Assembly according to claim 1, wherein said inter-connecting member is affixed to said upper vehicle part with a first tightening torque and said releasable fixation support is affixed to said upper vehicle part with a second tightening torque, said second tightening torque being substantially lower than said first tightening torque.

10. Assembly according to claim 1, wherein a base vehicle frame comprises a fixation member for preventing a displacement of said releasable fixation support in a direction perpendicular to a length direction of said releasable fixation support.

11. A vehicle rollover protection system comprising an assembly according to claim 1, wherein the upper vehicle part is a vehicle cab and the base vehicle part is a vehicle frame structure.

12. Vehicle rollover protection system according to claim 11, further comprising a vibration dampening element arranged on said base vehicle part and configured to suspend movement of the vehicle cab relative the vehicle frame structure, said vibration dampening element being arranged on top of a portion of said releasable fixation support.

13. A vehicle, comprising an assembly according to claim 1, a cab comprising the upper vehicle part, and a frame comprising the lower vehicle part.

14. A securing assembly for releasably engaging an upper vehicle part with a base vehicle part of a vehicle, and for ensuring that the upper vehicle part is secured to the base vehicle part in an operational state of the vehicle, said securing assembly comprising an inter-connecting member adapted to extend from the upper vehicle part to the base vehicle part in said operational state, said inter-connecting member having a body portion and a projecting portion defining an abutment surface,
   wherein said securing assembly further comprises a releasable fixation support adapted at a first end to be releasably affixed to one of the upper vehicle part and the base vehicle part and having a recess with an open end at a second end, said recess being adapted to accommodate a part of the body portion of the inter-connecting member, wherein another part of said second end of the releasable fixation support is capable of restricting displacement of said inter-connecting member in a direction towards said upper part vehicle by engaging with said abutment surface of said projecting portion in said operational state.

* * * * *